March 17, 1959 R. M. CARRIER, JR 2,877,890
VIBRATORY SPIRAL CONVEYOR
Filed July 7, 1955 2 Sheets-Sheet 1

INVENTOR.
ROBERT M. CARRIER JR.
BY
ATTORNEYS

March 17, 1959 R. M. CARRIER, JR 2,877,890
VIBRATORY SPIRAL CONVEYOR
Filed July 7, 1955 2 Sheets-Sheet 2

INVENTOR.
ROBERT M. CARRIER JR.
BY
Oberlin & Limbach
ATTORNEYS

United States Patent Office 2,877,890
Patented Mar. 17, 1959

2,877,890

VIBRATORY SPIRAL CONVEYOR

Robert M. Carrier, Jr., Louisville, Ky., assignor to Carrier Conveyor Corporation, Louisville, Ky., a corporation of Kentucky Application July 7, 1955, Serial No. 520,511

3 Claims. (Cl. 198—220)

The present invention relates generally as indicated to a vibratory conveyor, and more particularly to a conveyor in which the conveying element upon and along which material or work is supported and conveyed is in the form of a helically coiled tube of elastomeric material.

It is a primary object of this invention to provide a helical vibratory conveyor in which the helix is easily and economically wound from a length of flexible hose or tubing which needs to be supported only at relatively few and widely spaced-apart points therearound.

It is another object of this invention to provide a conveyor of the character indicated wherein heating, cooling, or other treatment of the work being conveyed may be easily accomplished by mounting the conveyor in the treating medium or in the path of flow thereof, or by circulating the treating medium through the helical conveying element itself either in the direction of conveying or in the opposite direction.

Another object of this invention is to provide a vibratory conveyor which, by reason of the employment of a helix made of elastomeric tubing, admirably serves as a parts feeder or the like to convey workpieces in aligned relationship without danger of marring of the surfaces thereof.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
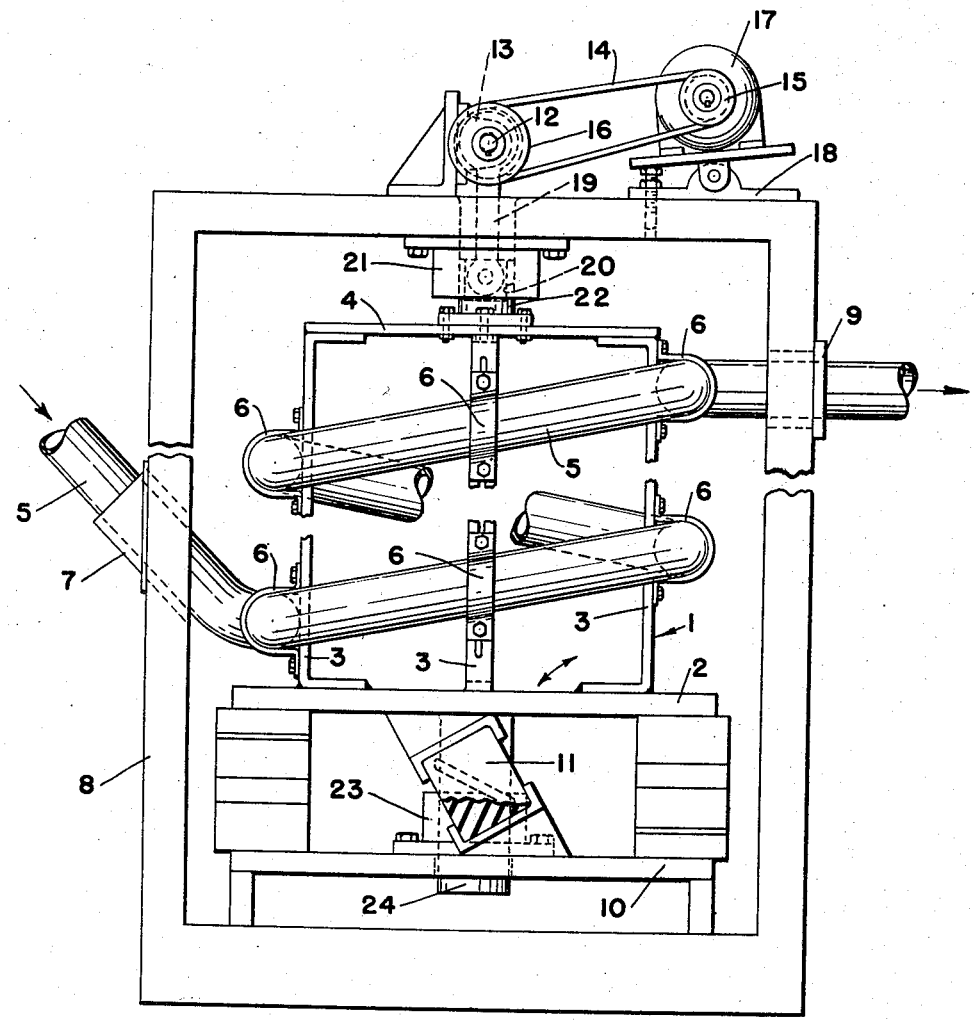
Fig. 1 is a side elevation view of one form of the present invention.

Referring now more particularly to the drawings, and first to Fig. 1, the helical conveyor proper 1 comprises a base 2 provided with upwardly extending brackets 3 welded or otherwise secured to the base 2, there being four equally spaced brackets 3 shown herein.

The upper ends of said brackets are joined together as by welding to an upper plate or spider 4 to thus form a skeleton framework for the coiling of a length of elastomeric tubing 5 therearound. Suitable vertically adjustable clips 6 are attached to the brackets to support the tubing in helical form as shown in Fig. 1.

As evident, any desired number of turns of the tubing may be employed, and the pitch of the helix may be varied as desired. In fact, in some instances, the tubing may be closely coiled so that the successive convolutions are close together or even in contact with each other, and in the latter instance each clip 6 may be extended from the bottom to the top convolutions.

The tubing 5 may be of any elastomeric material, including rubber and synthetic rubber, and flexible plastics, such as Tygon, for example.

The lower end of the helix 5 is bent upwardly and passes through a guide 7 therefor mounted in the frame structure 8 of the conveyor to constitute an inlet for the material to be conveyed. By reason of the flexibility of the tubing 5, the helical portion thereof may be vibrated with respect to the frame structure 8 even though the ends are attached to the frame.

The upper end of the helix may constitute the discharge spout of the conveyor, and similarly said upper end may extend through a guide 9 in the frame.

The base plate 2 aforesaid has spaced therebeneath another base plate 10, and extending between said base plates 2 and 10 and secured thereto are resilient connectors 11 which may be of any of the types disclosed in my Patent No. 2,706,112, dated April 12, 1955.

Said bottom base plate 10 is secured to the frame structure, and by reason of the angular disposition of the resilient connectors 11, vertical energy impulses applied to the conveyor will be resolved into generally helical oscillations having a vertical component and a horizontal component. Preferably, the path of vibration is such that the conveyable material in the helix will be progressively tossed forwardly and upwardly with respect to the material supporting surface thereof, and in this way material will be conveyed upwardly therearound.

In this case, vertical energy impulses are applied through an eccentric shaft 12 which is journalled in the bearings 13 at the top of the frame 8, the eccentric shaft 12 being rotated as by means of a belt 14 and pulley 15—16 drive, of which the pulley 15 may be of the adjustable type whereby the speed of the eccentric shaft 12 may be varied by tilting the electric motor 17 about its pivotal mount 18 to thus change the ratio of the diameter of the pulley 15 with respect to the pulley 16 on the eccentric shaft 12.

The eccentric throw of such shaft 12 has pivotally connected thereto one end of a pitman arm 19, and the other end of said pitman arm is pivotally connected to a block 20 which is vertically slideguided in the guide 21 of the frame. The upper plate 4 is secured by suitable bearing means 22 to said block 20 for movement vertically in unison with the block, but for rotation with respect to said block. In this way, the vertical energy impulses may be resolved into a generally helical motion of the helix 5 and its skeleton supporting framework by reason of the disposition of the resilient mounts 11.

It is to be understood, of course, that in lieu of the resilient mounts herein shown, circularly and obliquely disposed leaf springs may be substituted or a combination of circularly and obliquely disposed coil springs and pivoted rods may be substituted. Likewise, solenoid or other vibrators may be substituted for the eccentric drive herein.

The lower end of the conveyor may be guided, if necessary, by means of a suitable bearing 23 in which the shaft 24, depending from the base plate 2, slidably and rotatably fits.

By reason of the top driving of the conveyor, the entire conveyor including the frame 8 therefor may be immersed in a fluid-containing tank, or by reason of the exposure of the helix 5, cooling or heating gases may be blown thereacross or downwardly or upwardly therethrough. Moreover, if desired, suitable treating medium (liquid or gaseous) may be flowed through the helical tube 5 from the inlet to the outlet or vice versa.

By reason of the flexible nature of the helix 5, it has been found that granular and powdery materials are more effectively prevented from becoming lumpy during conveying thereof by reason of the secondary vibration or "bouncy" nature of the tubing itself in or out of synchronism with the vibrations imparted to the conveyor as a whole.

Figure 2:
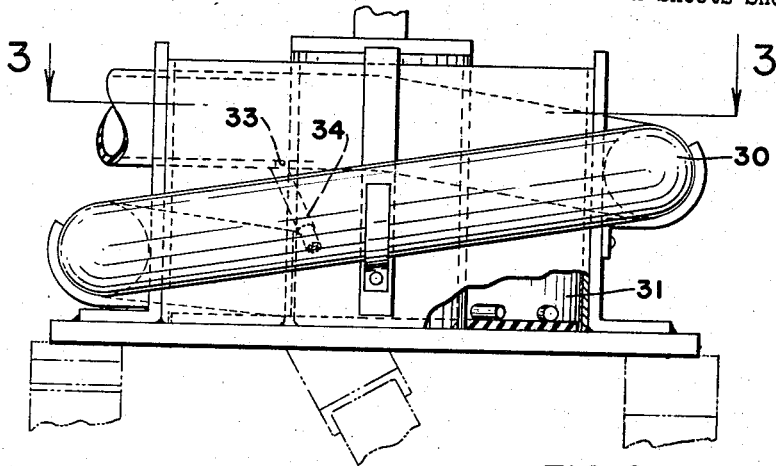
Fig. 2 is a side elevation view of another form of the invention.
Figure 3:
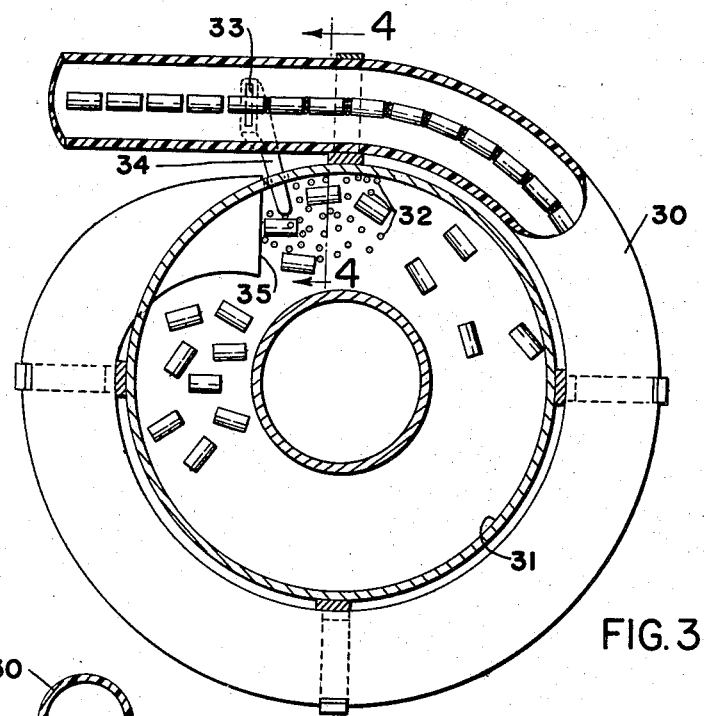
Fig. 3 is a horizontal section view taken substantially along the line 3—3, Fig. 2.
Figure 4:
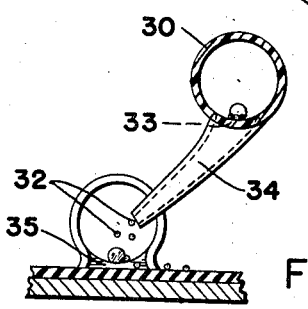
Fig. 4 is a fragmentary cross-section view taken substantially along the line 4—4, Fig. 3.

Referring now to the form of the invention illustrated in Figs. 2, 3, and 4, there is shown therein a one-turn helix 30 of elastomeric tubing, the lower end of which communicates with an annular space 31 which may be lined with flexible material into which parts to be conveyed and aligned are loaded and from which annular space the parts are conveyed and aligned as they are conveyed upwardly around the helix.

In the case of metal parts such as smooth-surfaced cylinders of say ½" diameter and 2" length, the lining of the space 31 with flexible material and the use of elastomeric tubing 30, the cylindrical surfaces of said parts are not in any way marred during the conveying thereof.

Furthermore, in order to eliminate the possibility of the end surfaces being marred, small rubber or rubber-like balls 32 are introduced into the annular hopper 31, and these balls will be conveyed along with the metal parts between the adjacent ends thereof. Thus, the ends of the cylindrical parts cannot bump into each other.

Adjacent to the discharge end of the helical tube 30, there is provided a discharge slot 33 for the balls 32 for return of the same through a down spout 34 into the loading chamber 31 of the apparatus, the slot in the tubing being of such size and shape that the cylindrical parts will yet continue to be conveyed in spaced-apart aligned relationship. The aligned parts may be fed to any of a variety of different apparatuses such as centerless grinders, measuring devices, or they may be transported to a point of use for assembly.

The lower end of the tubing 30 is preferably formed as is shown in Fig. 4 to provide a sloping ramp 35, up which ramp the cylindrical workpieces can only be conveyed in axially aligned relation, since in any other relation the parts will simply roll downwardly back into the annular hopper 31.

Moreover, by loading in the parts in the area A, they will be danced counterclockwise and will progressively move to ramp 35 when their axes are tangent to the arcuate component of the vibratory movements. As evident, cylindrical parts disposed generally radially will not be conveyed around the hopper 31, since the vibratory movements will simply tend to rotate the parts about their longitudinal axes without moving the same forwardly and around the bottom of the annular hopper.

In any event, by the time that the parts reach the inlet ramp 35 into the helical tube 30, they will be substantially in longitudinal alignment, and the rubber balls 32 will be interposed therebetween, and only those balls which are prevented from rolling down the ramp 35 by being positioned between the adjacent parts will be carried up around with the parts to the point adjacent the discharge end of the helix. At the last-mentioned position, the balls 32 will drop through the slot 33 back into the annular hopper 31.

Other modes of applying the principle of the invention may be employed, change being made as regards the details described, provided the features stated in any of the following claims, or the equivalent of such, be employed.

I therefore particularly point out and distinctly claim as my invention:

1. A vibratory conveyor comprising a frame resiliently supported for generally helical vibration about an upright axis, a length of elastomeric tube helically wound about and secured to said frame at circumferentially spaced points for vibration therewith and for secondary vibration of said tube between said points, and means for vibrating said frame and tube along a path such that material introduced into said tube is conveyed therethrough under the influence of said vibrations whereby granular and powdery materials are prevented from becoming lumpy during conveying.

2. The conveyor of claim 1 wherein said frame is provided with a container having a floor of elastomeric material, said container being surrounded by said tube, and said tube having its lower end leading into said container for conveying of parts therein upwardly through said tube.

3. The conveyor of claim 1 wherein said frame is provided with a container disposed within said tube, said tube having its lower end leading into said container for conveying of parts therein upwardly through said tube, said tube above its lower end, being formed with a discharge port past which the larger parts are conveyed but through which smaller parts are discharged back into the container.

References Cited in the file of this patent

FOREIGN PATENTS

| | | |
|---|---|---|
| 943,865 | France | Oct. 11, 1948 |
| 1,045,631 | France | July 1, 1953 |